Aug. 25, 1931.    O. G. KLEIN    1,820,463
CLINKER TONGS
Filed April 30, 1931
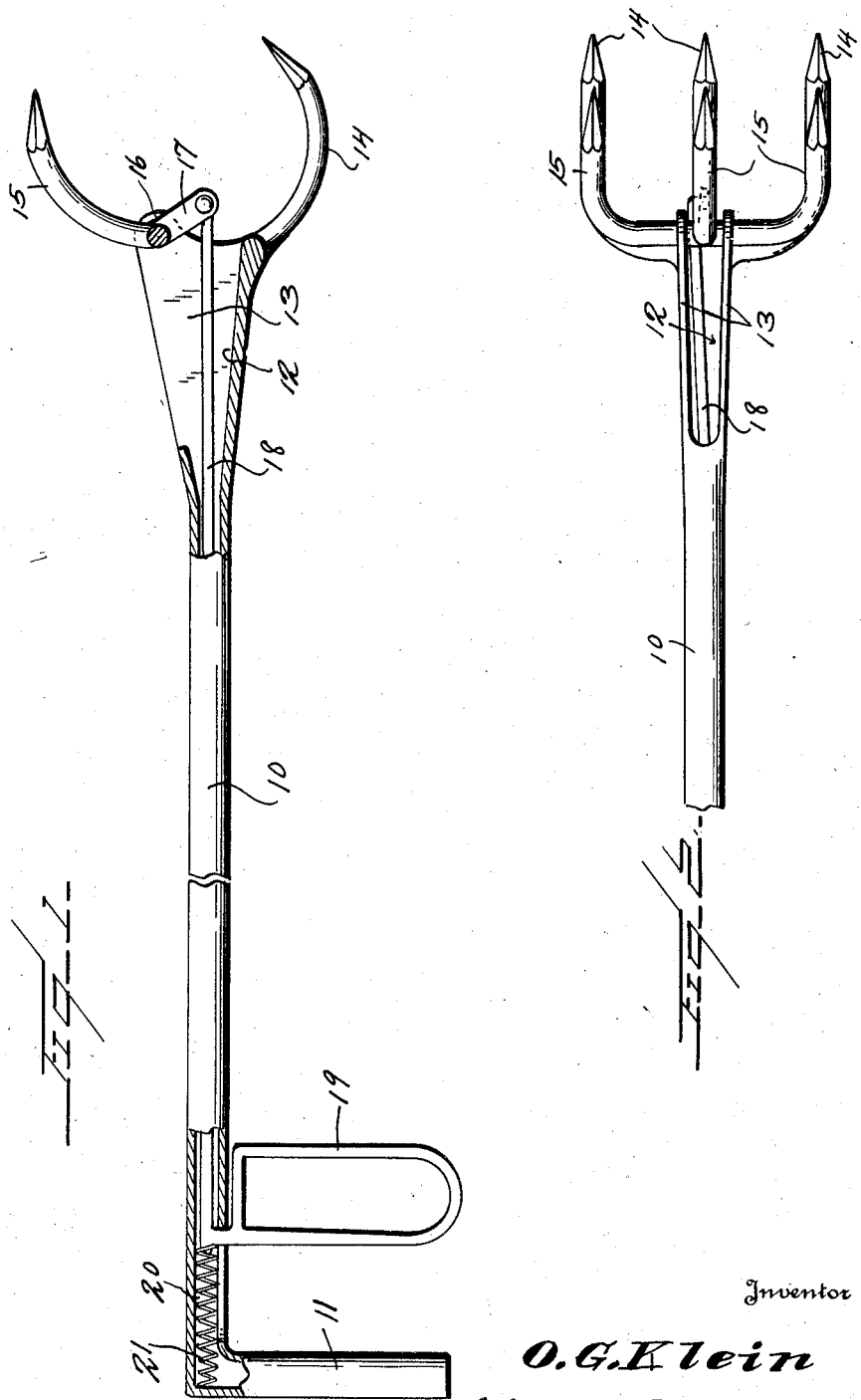
Inventor
O. G. Klein
By Watson E. Coleman
Attorney Patented Aug. 25, 1931

1,820,463

UNITED STATES PATENT OFFICE

OTTO G. KLEIN, OF BARRON, WISCONSIN

CLINKER TONGS

Application filed April 30, 1931. Serial No. 534,034.

This invention relates to tongs for picking up hot coals, clinkers and the like, and the general object of the invention is to provide a very simple, strong and effective tongs of this character so constructed that there will be a plurality of opposed claws which will engage the clinker and keep it from twisting around in the tongs and falling out.

A further object is to provide clinker tongs which will not pick up ashes and spill these ashes on the floor, which is neat, compact and which has no bolts or rivets to get loose and which is so constructed that a thoroughly good grip may be secured upon the clinker.

My invention is illustrated in the accompanying drawings, wherein:—

Figure 1 is a side elevation partly in section of my improved clinker claws;

Figure 2 is a fragmentary top plan view of the claws.

Referring to these drawings, 10 designates the tubular shank of the clinker tongs which at one end is provided with the angular handle 11 and at the other end is bifurcated as at 12.

The fork so formed is transversely U-shaped in cross section to provide the two opposed relatively triangular portions 13. Attached to the closed edge of the fork and forming part therewith are the three claws 14. Opposed to these claws 14 are the claws 15, also three in number, these claws being joined at 16, one of the claws being disposed within the fork 12, that is, between the two webs 13, while the other two claws are disposed outwardly of these webs, the shanks of the claws passing through the openings in the plate 13. This construction holds the claws from any lateral movement, but permits them to be oscillated toward or from the claws 14. For the purpose of oscillating the movable claws 15, I form the movable claws with the inwardly extending arm 17 and extend upward through the tubular handle shank 11 the rod 18 which at its lower end is pivotally engaged with this arm 17. The opposite end of this rod is provided with an outwardly projecting hand grip 19 disposed in parallel relation to the handle 11 and projecting out through a slot 20 formed in the handle shank just below the handle 11. A coiled compression spring 21 is disposed within the tubular handle shank and bears at one end against the extremity of the handle shank and at its other end bears against the extremity of the rod 13, thus urging the jaws open.

The operation of this device will be obvious from what has gone before. The jaws or claws are normally held in an open position, but when the handle 19 is pulled toward the handle 11, the pivoted claws will close toward the fixed claws, thus gripping a clinker or other object between them and permitting it to be readily handled without danger of the clinker falling out from the claws.

It will be seen that this construction is very simple, that it may be cheaply made and that it is thoroughly effective. There are no rivets, bolts or other parts which are liable to get out of order and inasmuch as the claws are each formed with three widely separated prongs, it is obvious that no ashes or other matter will be pulled out with the clinker which will get upon the floor of the cellar, furnace room or the like.

I claim:—

A clinker tongs having a tubular handle shank formed with a handle at one end, the other end of the shank terminating in a fork defined by two webs, fixed separated claws attached to said web, and opposed claws pivoted in said web and having an angularly projecting arm, a rod connected to said arm and extending longitudinally through the handle shank and at the end remote from the claws being angularly bent and extended out through a slot in the handle shank, and a compression spring disposed between the handle of the operating rod and the handle on the handle shank and urging the pivoted jaws to an open position.

In testimony whereof I hereunto affix my signature.

OTTO G. KLEIN.